United States Patent
Paolini

(10) Patent No.: US 6,429,793 B1
(45) Date of Patent: Aug. 6, 2002

(54) ABSTRACTION OF INPUT MAPPING FOR KEYBOARDS

(75) Inventor: Michael Anthony Paolini, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/204,893

(22) Filed: Dec. 3, 1998

(51) Int. Cl.⁷ .............................................. H03K 17/94
(52) U.S. Cl. ............................ 341/22; 341/20; 341/26
(58) Field of Search ............................ 341/20, 22, 26, 341/23; 345/172; 400/477; 364/708.1

(56) References Cited

U.S. PATENT DOCUMENTS

| | | | |
|---|---|---|---|
| 4,633,227 A | * 12/1986 | Menn | |
| 4,823,311 A | * 4/1989 | Hunter | 341/23 |
| 4,844,637 A | * 7/1989 | Buisson et al. | |
| 4,853,888 A | * 8/1989 | Lata et al. | |
| 4,879,557 A | * 11/1989 | Roche | 341/23 |
| 5,101,201 A | * 3/1992 | Chel | |
| 5,144,567 A | * 9/1992 | Elsch et al. | |
| 5,280,283 A | * 1/1994 | Raasch et al. | |
| 5,387,042 A | * 2/1995 | Brown | 400/477 |
| 5,402,121 A | * 3/1995 | Noorbehesht | 341/26 |
| 5,450,078 A | * 9/1995 | Silva | 341/26 |
| 5,623,261 A | 4/1997 | Rose | 341/26 |

* cited by examiner

*Primary Examiner*—Michael Horabik
*Assistant Examiner*—Albert K. Wong
(74) *Attorney, Agent, or Firm*—Duke W. Yee; David A. Mims, Jr.; Lisa L. B. Yociss

(57) ABSTRACT

Scan codes from an input device, such as a keyboard, are intercepted before being mapped to the operating system virtual key codes and instead are mapped to virtual key codes on an Abstract Virtual Keyboard. The Abstract Virtual Keyboard (AVK) supports scan codes for every known keyboard so the operating system could support multiple instances of input devices which were heretofore incompatible. The AVK vKeyCode is then passed through a filter if one is available for the AVK vKeyNumber. Next, a country language layout is called for the appropriate country and plugged into the AVK and the AVK vKeyNumber is entered. If an operating system (OS) virtual key code is returned, the system processes the OS virtual key code into a function or a character in the conventional manner. If no OS virtual key code is returned, another filter method is called to construct a key event. After an OS virtual key code is constructed from the filter, the operating system processes that code.

90 Claims, 4 Drawing Sheets

ABSTRACTION OF INPUT MAPPING FOR KEYBOARDS

BACKGROUND OF THE INVENTION

1. Technical Field

The present invention relates in general to a method and system for data processing and in particular to a method and system for processing data input to a data processing system utilizing an input device having a number of keys. Still more particularly, the present invention relates to a method and system for translating keyboard scan codes from a variety of different keyboards and devices into codes which may be utilized by a number of data processing systems having diverse operating systems.

2. Description of Related Art

Prior art such as disclosed in Rose, U.S. Pat. No. 5,623,261, "A Method And System For Translating Keyed Input Within A Data Processing System", which is incorporated by reference in it entirety here within, discloses conventional key codes translation utilizing an operation system's virtual key codes. A number of input devices such as mice, touch screens, digitizing tablets and speech devices have been recently developed to enhance user interface to data processing systems, however, the keyboard in one form or another remains the primary device utilized to input data to data processing systems. A typical keyboard includes a number of keys, which are cache associated with at least one character or function. For example, the enhanced keyboard commonly utilized with personal computers such as the IBM Personal System 2 (PS/2) has 101 keys, including alphanumeric character keys, key modifiers or keyboard state keys (Alt, Shift, Ctrl., number lock etc.), cursor positioning keys, and 12 function keys (F1–F12).

In a typical personal computer system, keystrokes are detected by a microcontroller within the keyboard which continuously scans each of the keys to determine if a key has been pressed or released. When a change in the state of a key is detected, the microcontroller generates a unique scan code which specifies the key that has changed state and whether the key has been pressed (a make code) or released (a break code). The microcontroller within the keyboard then serially transmits the scan code generated by the keystroke, which is typically one or two bytes in length, to a keyboard driver within the system unit. The keyboard driver, in turn, issues an interrupt to the central microprocessor (CPU) indicating that a scan code is available to be read.

After the scan code generated by the keyboard microcontroller is read by the CPU, the CPU translates the scan code into an input code recognizable by the personal computer operating system utilizing a translation table within the Basic Input/Output System (BIOS) code stored in ROM. The translation table is arranged as a fixed length array in which a number of scan codes are stored in association with corresponding input coces. As will be understood by those skilled in the art, the translation table must supply a scan code translation for each combination of keyboard type and country layout (i.e., national language) supported by the personal computer system. Because a number of keyboard behaviors are unique to a specific country layout, the translation table typically includes hardcoded operating system-dependent commands in order to reduce the memory required to store the translation table. For example, translation tables may include operating system-dependent commands to translate scan codes input in conjunction with particular key modifiers (e.g., "a" with Caps Lock and Shift) for a particular country layout. After the CPU has translated the input scan code into an input code by referencing the translation table, the input code is processed in accordance with the operating system software executing within the CPU.

Although the conventional method of converting keyboard keystrokes into character and function input codes performs efficiently for a given combination of keyboard hardware, country layout, and operating system, a problem arises when the growing number of keyboard configuration and operating systems is considered. Since the translation table which converts scan codes into character and function input codes contains operating system-dependent special purpose code written specifically for each combination of country layout and keyboard hardware, the translation table is not transportable between data processing systems utilizing different operating systems and keyboard hardware. Thus, a translation table must be written for each permutation of operating system, country layout, and keyboard hardware.

The problem is that there are hundreds of devices that fall in the category of computer keyboard. The most common devices range from 80 to 122 keys. The key positions and the mapping of individual keys on these keyboards produce different scan codes that typically, but not always, fall into one of three standards (scan sets 1, 2, 3). These scan codes must in turn be mapped to a character output base on the language being used. As described above, this is typically done through a translation table, a virtual key code. In one example, a scan under scan 3, a scan code of 0x5d would map to a backslash on a Japanese keyboard. A U.S. keyboard would not produce this result since it does not have a key in the exact position as the Japanese keyboard. However, the U.S. keyboard would produce a backslash with a different scan code. Interestingly, a U.S. 102 keyboard would also produce a different scan code for a backslash than a U.S. 122 keyboard. Therefore, two different U.S. keyboards could produce different scan codes for the same character output. Further complicating the problem of keyboard-generated scan codes is some manufacturer's practice of placing extra functions on a keyboard such as cut, copy, paste, or an operating system home key.

It can be seen that the number tables needed to support all of the potential input devices available, in each country's layout and local dialect, becomes unwieldy to store and manage. For each keyboard supported the operating system must have available to it keyboard mapping conversion tables to each country and/or local country dialect. The prior art dedicates an enormous amount of memory space to translation tables for keyboards and country languages.

Additionally, in order to support additional keyboards prior art must dedicate more memory space for the keyboard layout as well as translation mappings for each country and local country dialects for support in those countries.

Further, functional keyboards such as ergonomic keyboards become a problem as the keys can be rearranged on the face of the keyboard. The prior art adequately handles the case where the scan codes remain the same for the character representations, however, the scan codes change in response to repositioning the keys entire new set of translation tables must be constructed in addition to modifying the device driver for-the keyboard.

Finally, the prior art is inflexible because modifications such as adding or deleting keys or adding new functionality to keys require modifying virtually every translation table associated with the keyboard. Therefore, it would be advantageous to have an improved method and apparatus for processing scan codes from different types of input devices.

SUMMARY OF THE INVENTION

One advantage of the present invention is to reduce the enormous memory consumption of the translation tables by creating an additional layer of abstraction for mapping all known keyboard inputs.

Another advantage is to create a hardware dependent key code class for modifying the hardware and maintaining a set of country language and local dialect code tables which can be reused with all available input devices.

Still another advantage of the present invention is to provide flexible support for variable placement keyboards such as ergonomic keyboards.

Still another advantage of the present invention is to provide the flexibility needed to modify individual key associations without modifying every country language and local dialect table.

Still another advantage of the present invention is to allow any device to function as a keyboard.

Still another advantage of the present invention is to supply multiple keyboard mappings simultaneously in different languages.

Still another advantage of the present invention is to provide support for using multiple real keyboards simultaneously.

Still another advantage of the present invention is to pass the keyboard state to the operating system virtual Key Tables.

Present invention includes a system, method and software embodiment of a method for processing scan codes from a plurality of input devices by receiving the scan codes from the input devices, mapping signals to an abstract virtual code contained in an abstract code table, then determining an output code of each abstract virtual codes by selecting a conversion table related to the country code or local dialect and determining an entry point on the selected conversion table based on the abstract virtual codes mapped from the abstract Key Table. By doing so, an operating system can support multiple keyboards from different vendors each having different keyboard layouts, simultaneously. Rather than creating separate tables for each input device, the abstract Key Table reuses codes from one keyboard to another and adds only codes as needed to define keys which are not defined in the abstract Key Table.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
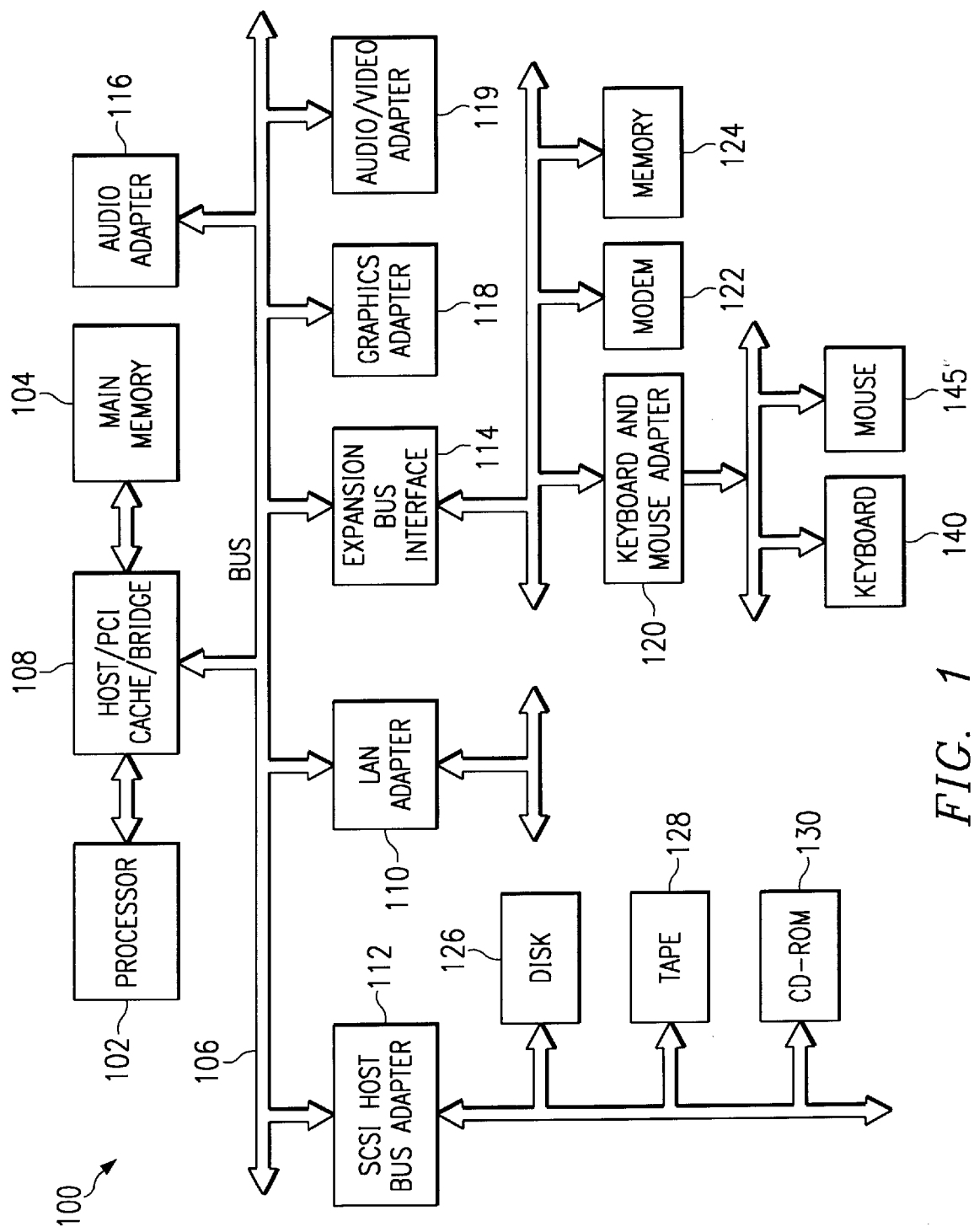
FIG. 1 is a block diagram of a data processing system in the present invention may be implemented.

FIG. 1 is a block diagram of a data processing system in the present invention may be implemented;

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a modem 122, additional memory 124 keyboard and mouse adapter 120. Keyboard mouse adapter 120 contains the I/O controller needed to issue interrupts in order to notify the microprocessor 102 of a state change of either the keyboard 140 or the mouse 145. Upon user key action, the onboard keyboard microprocessor detects the keystroke and issues a scan code associated with that key position to the I/O controller within the keyboard and mouse adapter 120. The I/O controller issues an interrupt to processor 102, alerting the processor of a scan code from the keyboard 140.

SCSI host bus adapter 112 provides a connection for hard disk drive 126, tape drive 128, CD-ROM 130, and digital video disc read only memory drive (DVD-ROM) 132 in the depicted example. Typical PCI local bus implementations will support three or four PCI expansion slots or add-in connectors. Those of ordinary skill in the art will appreciate that the hardware in FIG. 1 may vary. For example, other peripheral devices, such as optical disk drives and the like may be used in addition to or in place of the hardware depicted in. FIG. 1. The depicted example is not meant to imply architectural limitations with respect to the present invention.

Figure 2:
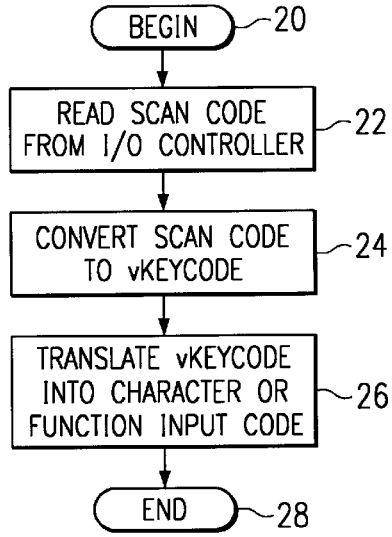
FIG. 2 illustrates a prior method of input mapping for a keyboard.

FIG. 2 illustrates a known method of input mapping for a keyboard. The process begins when the keystroke is detected such as the user depresses or releases a key on keyboard 140 (step 220). The user action changes the state of keyboard 140 which causes the keyboard microprocessor to issues a signal. The signal is in the form of a scan code which is dependent on the key position of the key selected by the user. The scan code is received by the I/O controller within keyboard and mouse adapter 120. The scan code controller issues an interrupt to notify processor 102 that a scan code has been received from keyboard 140. Processor 102, through Host/PCI Cache Bridge 108 reads the scan code through the local bus 106 from the scan controller residing in keyboard and mouse adapter 120 (step 222). In processor 102, the scan code is converted to a virtual key code (step 240).

It will be understood by those who are so skilled in the art virtual key codes as described by International Organization for Standards ISO keyboard position notation are a systematic method of describing the relative position of keys on the keyboard.

In the prior art, the processor 102 translates scan codes in the ISO virtual key codes, vKeyCodes, utilizing conversion tables, Key Tables, stored within its main memory 104 either in a RAM or ROM memory which maps each scan code to a vKeyCode.

One of the shortcomings of the prior art is that because the scan codes are input device dependent (keyboard), a separate conversion table for each device or each unique keyboard must be supported by the data processing system.

The vKeyCode is sent to the computer processor 102 and is translated from a vKeyCode into a function input or an output character (step 260).

As described above, the prior art method lacks flexibility, not only in the fact that separate tables must be supported for each specific keyboard and input device, but also because separate translation mapping tables for each country language must be associated for key codes of each keyboard or input device. Therefore, the total number of tables needed by an operating system to support the possible variations of keyboard type and country dialect grows exponentially with the spoken word. The introduction of ergonomic keyboards in which the key position and key character themselves can be redefined by the user, as with the other problems described above, are not easily resolved in the prior art method.

Figure 3:
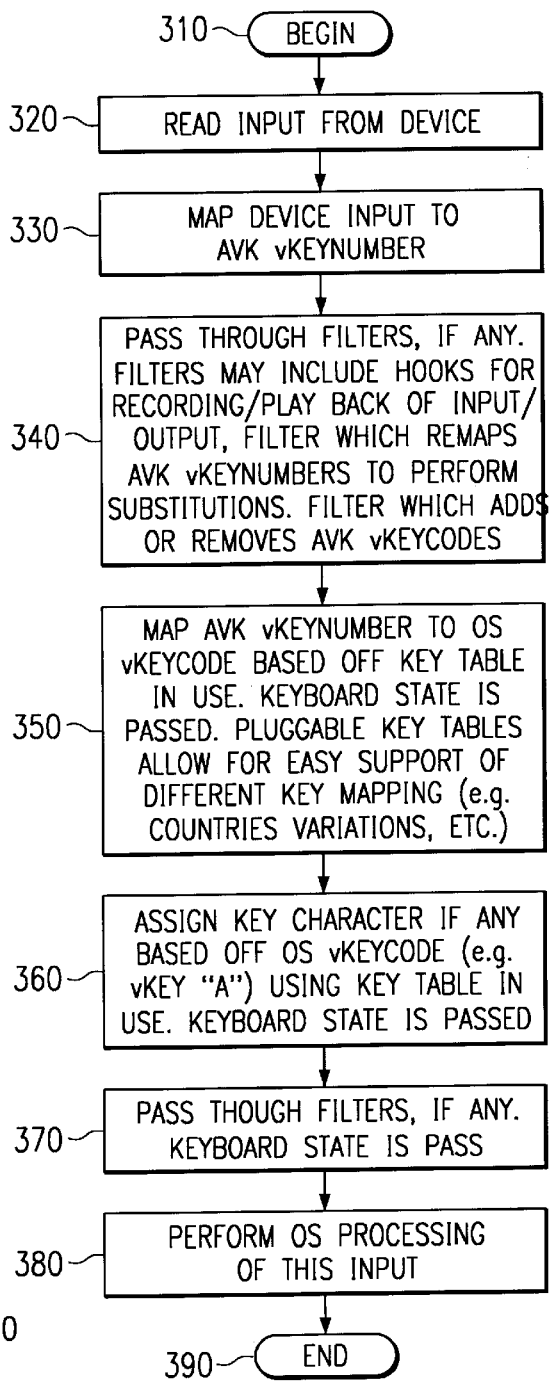
FIG. 3 illustrates a method of input mapping of keyboards in an object-oriented environment as disclosed by the present invention.

Referring now to FIG. 3, a method of input mapping of keyboards in an object-oriented environment is illustrated as disclosed by the present invention. The process begins with a detection of a keystroke (step 310) which roughly correlates to the functionality in step 220 in FIG. 2 of prior art. Initially a user either depresses or releases a key on keyboard 140. A scan code which represents the position of the selected key on the keyboard is sent to the I/O controller. An interrupt is generated by the I/O controller, sent through bus 106 and eventually reaches processor 102. The scan code is then read from the I/O controller located in the keyboard and mouse adapter 120 (step 320).

Upon reaching processor 102, rather than mapping the scan codes to the ISO vKeyCodes as in the prior art, an extra layer of abstraction is added to the method. The scan code is mapped to a virtual key number (vKeyNumber) on an abstract virtual keyboard (step 330).

The abstract virtual keyboard (AVK) used in the present invention adds an extra level of extraction between the hardware and the vKeyCode mappings from which the different keyboard layouts are mapped. In a round-about way, the AVK maps all known keyboard keys to the OS vKeyCodes. Each key on every known keyboard is mapped to an AVK virtual key number, vKeyNumber, on the AVK. The AVK is larger than any existing keyboard because it contains all of the button placements/functions from every keyboard in existence. An AVK vKeyNumber might map to several different keys on different keyboards or might only map to a single key on a specific keyboard. AVK vKeyNumbers correspond to specific characters and functions of the key and not the scan codes generated by the individual device drivers. In other words, several different scan codes might map to the same AVK vKeyNumber if those scan codes are generated from the same character or function. In this way AVK vKeyNumbers are reused for identical characters or functions regardless of the keyboard type. Hence, the use of the AVK reduces the number of Key Tables needed because a separate Key Table is not needed for every type of keyboard. Additional AVK vKeyNumbers are added only when a character or function on a keyboard has not been defined within the AVK.

The AVK vKeyNumber passes through a filter, if a filter is available (step 340). Filters provide a variety of functions. Filters may add or remove an AVK vKeyNumber. For instance, repetitive keystrokes may be deleted after a certain number of vKeyNumbers are detected or to only pass through AVK vKeyNumbers in which the keystroke has been held for a certain period of time. Filters may also substitute one AVK vKeyNumber for another. An example might be to correct an erroneous scan code issued from a device driver without having to rewrite the device driver itself. One important aspect of the present invention is that filters may record or playback an input or output. The filter may call a method for recording the key code translation process from beginning to end and make it available for inspection. Or once recorded, the recording could be played back as a substitute for another AVK vKeyNumber.

Additionally, filters may call an external method for determining :AVK vKeyNumbers. An example might be a method for correcting "trembling hand" keystroke errors by deleting AVK vKeyNumbers in which the keystrokes are not depressed for a given time period. In another example the method delete AVK vKeyNumbers associated with the repetitive keystrokes after a threshold number has been reached. Even though these filters are external, they would appear to be local to the method. Filters may also call a second, third or higher, filter method and link the called filters into a chain of filters. For instance a recording method might be called and linked to a method for eliminating repetitive AVK vKeyNumbers. Therefore, a single AVK vKeyNumber might map to a series of key events via the filter key.

Next, the AVK vKeyNumbers are mapped to the operating system (ISO) based off the country Key Table in use (step 350). Memory 104 stores a plurality of Key Tables based on country languages, local dialects, operating system functional keys or even keyboards with functional arrangements such as ergonomic keyboards. In other words, an AVK vKeyNumber is not mapped directly to an OS vKeyCode but instead is mapped through one of the country Key Tables stored in memory. Because the AVK vKeyNumbers correspond to every key on every keyboard in existence, the country Key Tables need not be modified for the hardware as in the prior art. The country Key Tables reference AVK vKeyNumbers rather than tables for each individual keyboard supported by the system.

Therefore, only a single, pluggable Key Table need to exist in memory for each language and dialect. The AVK vKeyNumbers are mapped through plugable country Key Tables to the OS vKeyCodes (step 350). Variable keyboards such as ergonomic keyboards present a problem very similar to that of country languages. Keyboards, which allow the user to rearrange the key positions without changing the scan codes, are treated identically to country languages. A new Key Table for the arrangement is created just as for a new country layout. The device driver remains intact. If however, the scan codes change with the key arrangement, then only one new device driver is needed in addition to the new Key Table.

It can be clearly seen that the use of the extra layer of abstraction reduces the number of country Key Tables needed to support any one device. Device flexibility is absorbed in the AVK and not in combination of country Key Table and OS vKeyCodes. Therefore, no matter what kind of input device or keyboard used, the same Key Table would be used for that country as long as the scan codes from the device could be mapped to existing AVK codes in the driver for that device. Additionally, because the AVK vKeyNumbers in the AVK Key Table correlate to every known key on every known keyboard, keyboards that were previously considered incompatible with each other because of inconsistencies in the scan codes, can be used simultaneously under the same operating system.

Key characters are assigned based on the operating system vKeyCode using the Key Table that was selected in step 350 (step 360). Again, the operating system vKeyCode can be based on the prior art ISO standard. The ISO standard, however, is not the only possible vKeyCodes available. One of ordinary skill in the art would realize that other standards, such as Java Virtual Keys, are available and that the present invention is flexible enough to conform to other operating systems or operating systems in the future with little or no experimentation.

The result is passed through a filter, if needed (step 370). The operating system recognizes the input and performs a function or a character output based on the OS vKeyCode (step 380).

Figure 4:
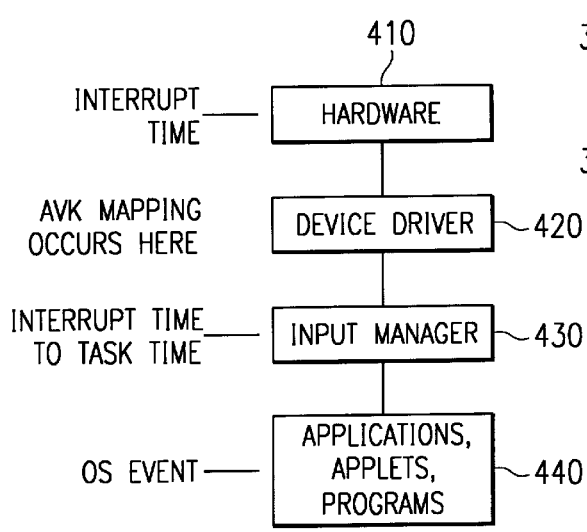
FIG. 4 illustrates the present invention as it relates to the system and timing within the system of the character function generation.

FIG. 4 illustrates the present invention as it relates to the system and timing within the system of the character function generation. Block 410 represents hardware such as keyboard or mouse. It must be made clear that although the depicted embodiment utilizes a keyboard, other types of input devices could be used in its place. For example, a mouse, a joystick, a speech input device, or any multiple or combination of the above could be used instead, or in combination with a keyboard. Block 420 represents the device driver for the specific input device or devices used. The device driver is responsible for assigning the proper code to a keystroke position. Other functionality of the device driver with respect to the present invention is described above.

Block 430 represents the input manager, such as keyboard and mouse adapter 120 in FIG. 1 with the I/O controller which issues interrupts for the microprocessor 102. The extra layer, of abstraction is added after the interrupt time processing 430. During task time processing, in input manager 430, AVK mapping occurs in accordance with a preferred embodiment of the present invention. Scan codes from the specific device drivers are then mapped to specific AVK vKeyNumbers. Assuming a keyboard input device, a method is called for determining the OS vKeyCode assignment depending on the AVK context. AVK context relates to whether the key is depressed or released, the AVK number, and the origin of the AVK vKeyNumber. At block 440 the operating system event is initiated from this assignment.

Figure 5:
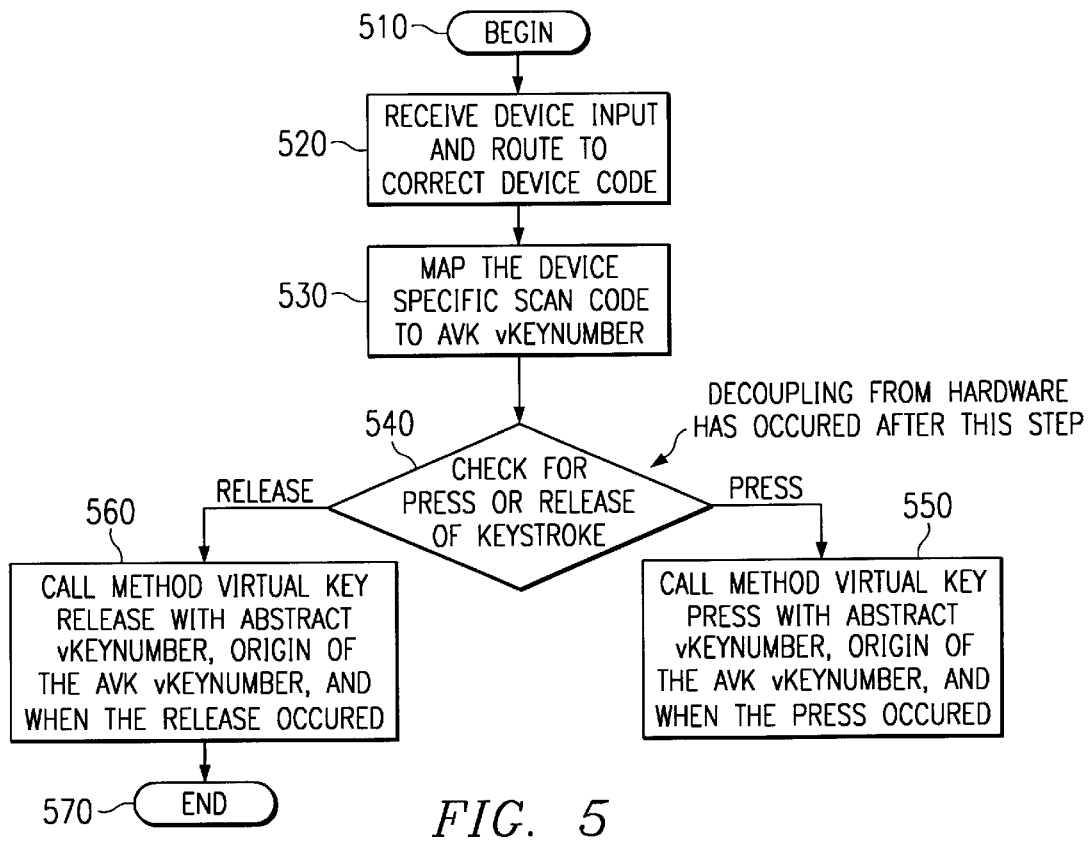
FIG. 5 illustrates the object call method of the present invention.

FIG. 5 illustrates the object call method of the present invention. The process begins as described above with the user either depressing or releasing a key (step 510). Next, the device input initiated by the user is received and routed to the correct device scan code (step 520). As mentioned before, the device scan code generation from the input device is a function of the device driver for that specific input device. The device specific scan code an AVK vKeyNumber (step 520). A determination is made as to which method is called (step 540). This step is initiated by detecting either a press or release of a keystroke. Once this determination is made, the method is effectively decoupled from the hardware until another interrupt is issued signifying another scan code is detected. If the user input had been to depress a keystroke, assignment key character action is determined based on a method virtual key press (step 550). The specific method virtual key press is called by knowing the AVK method context. The AVK method context is determined by the AVK vKeyNumber, the origin of the AVK vKeyNumber, and when the press occurred. By executing the method that had been called, a character key based off the OS vKeyCode can be determined. If, on the other hand, the user input is determined to be a release, a method virtual key release is called (step 560). As above, the method is called by knowing the AVK vKeyNumber, the origin of the AVK vKeyNumber and when the release occurred. Again, as in the above, the OS vKeyCode is determined in this method.

Figure 6:
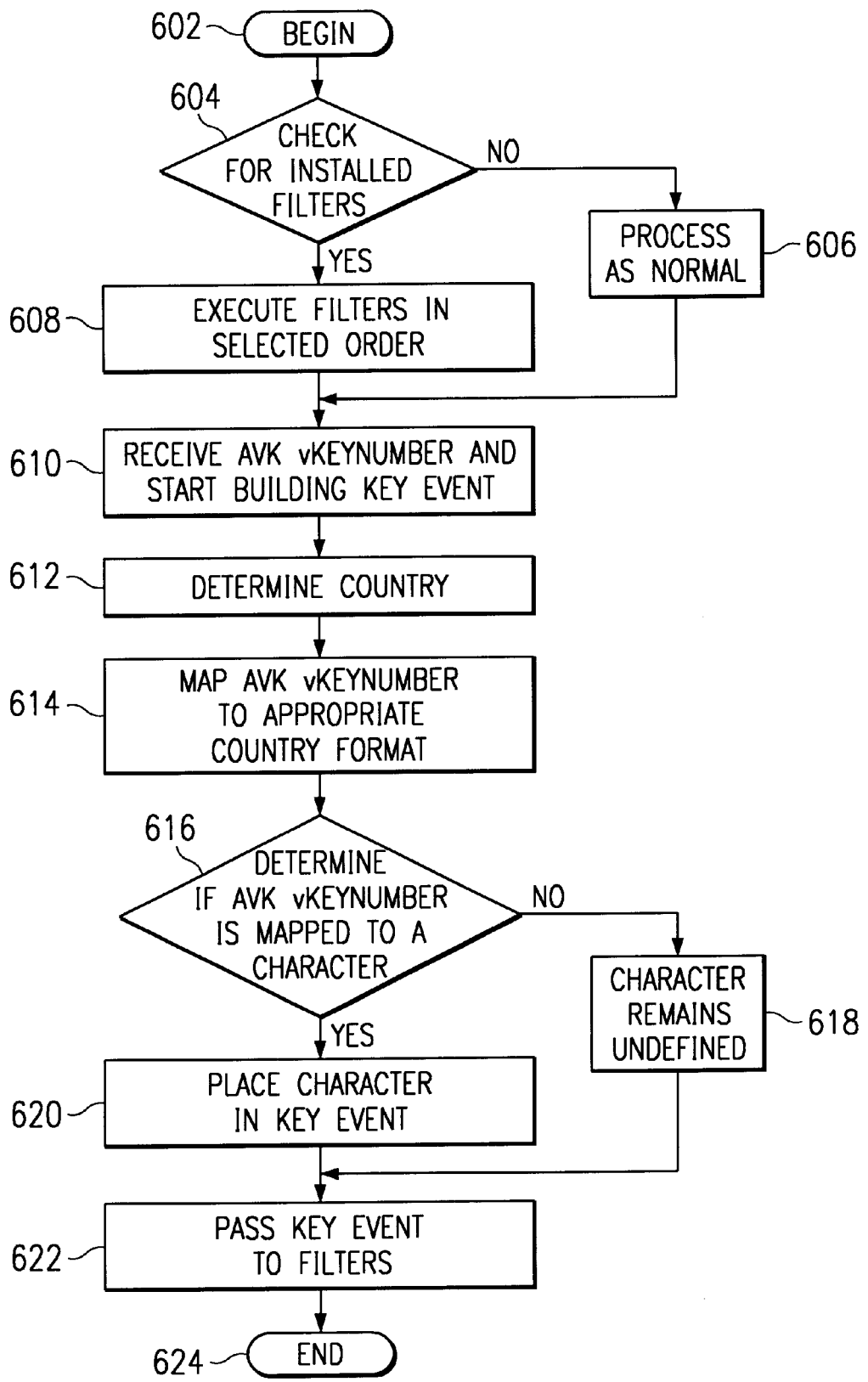
FIG. 6 illustrates a more detailed view of the present invention, taken from the time at which the input has been mapped to an AVK vKeyNumber.

FIG. 6 illustrates a more detailed flowchart of the process of the present invention, taken from the time at which the input scan code has been mapped to an AVK vKeyNumber. The process begins when an AVK vKeyNumber has been mapped from the scan code generator via the device driver of a specific device such as a keyboard (step 602).

Next, checks are made to see installed filters are present (step 604). If no filters are present, the AVK vKeyNumber processes normally (step 606) and remains unchanged. The AVK vKeyNumber is then used to build a key event if applicable (step 610). If, on the other hand, filters are present, (step 604) they are executed in order of occurrence (step 608).

One important aspect of having filters available at this point is to receive and correct the AVK vKeyNumber for the device regardless of what character or function the AVK vKeyNumber will ultimately map to. In other words, a filter can generate a new key event for processing. In fact, a series filters can be combined by adding filters from the event manager thereby creating a link list of filters. After obtaining a vKeyNumber either, by executing the filters or using the AVK vKeyNumber, the key event can be built (step 610).

Next, a country Key Table is selected for the language of the country and the country layout of the keyboard (step 612). As a practical matter, the country Key Table has been selected prior to the keystroke and plugged in. As mentioned above, other possible Key Tables include tables for rearrangable keyboards such as ergonomic keyboards. The AVK vKeyNumber is then mapped to the appropriate country format (step 614).

A determination is then made to see if a character actually exists in the selected country Key Table for the AVK vKeyNumber (step 616). If a character exists within the country key Table, it is placed in the key event (step 620). The key event is then passed to the filters (step 622). These filters may act either on the country character or the AVK vKeyNumber if no character exists within the country Key Table for the AVK vKeyNumber. If no character code exists in the country Key Table for the AVK vKeyNumber, the character remains undefined (step 618). The AVK vKeyNumber is then passed to the filter (step 622). These filters are similar to the filters executed at step 608. However, these filters may operate on either the AVK vKeyNumber or the country character unlike the filters above which operate on the AVK vKeyNumber only. Here, rather than just performing vKeyCode dependent operations, the operations could depend on either the AVK vKeyNumber or country character from the country Key Table. So filters might be available for either a specific vKeyNumber as in step 608 above, or might be available for a specific country character. Once the key event passes through the filters, the operating system processes the AVK vKeyNumber as described above at end 624.

Figure 7:
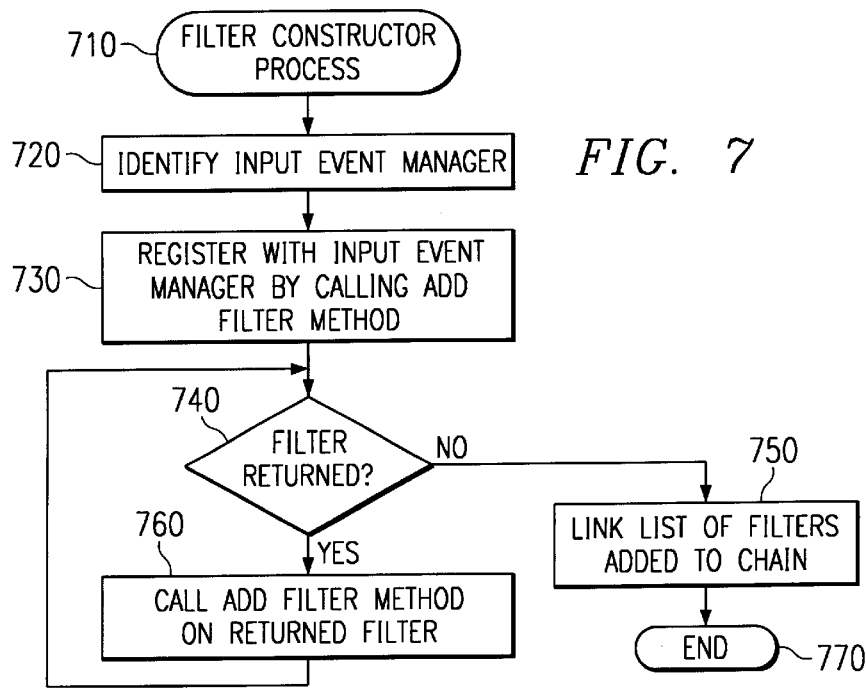
FIG. 7 illustrates the filter construction process as implemented in the present invention.

FIG. 7 illustrates the filter construction process as implemented in the present invention. As noted above, a filter can create a specific key event. In fact, each filter can, while appearing to be local, talk to remote operators and generate a key event. The process starts by identifying: the input event manager (step 712). A call add filter method with the input event manager is made (step 730). Add filter method associated with the event manager returns either a minus 1, indicating there is no filter, or returns a filter. A determination is made as to what result is returned from the add filter method (step 740). If on the initial pass, no filters return, the AVK vKeyNumber is processed by the operating system to generate a character or function as described above. If a filter is returned, a call is made for the add filter method on the returned filter (step 760). Once an add filter method is called, a check is made to whether a filter was returned or not. If no filter was returned, the list of filters that had been accumulated from the add filter method calls, are added to the chain of filters that already exists. If, on the other hand, another filter is returned on the add filter method call of the previously returned filter, the process again returns to block 760 to call another add filter method from the second returned filter. Again, upon execution of the most recent add filter method loop, a determination is made as to whether a filter is returned (step 740). At some point no filter is returned from the call and all the returned filters are added to the chain of filters which exists at 750 and the process ends at 770.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a signal from device inputs, the method comprising computer implemented steps of:
   (a) receiving a signal from an input device;
   (b) mapping the signal from the input device to a key number of a plurality of key numbers contained in an abstract key table;
   (c) determining an output code comprising:
      (i) selecting a conversion table; and
      (ii) mapping the key number to an output code in the selected conversion table; and
   (d) processing output codes through an operating system.

2. The method recited in claim 1, wherein the signal from the input device which is mapped to the key number is a first signal from a first input device which is mapped to a first key number and further comprising:
   (a1) receiving a second signal from a second input device; and
   (b1) mapping the second signal from the second input device to the first key number contained in the abstract key table, wherein both the first signal received from the first input device and the second signal received from the second input device, map to the first key number.

3. The method recited in claim 1, wherein the signal from the input device which is mapped to the key number is a first signal from a first input device which is mapped to a first key number and further comprising:
   (a1) receiving a second input of a first signal from a second input device;
   (b1) mapping the second input of the first signal from the second input device to a second key number contained in the abstract key table, wherein the first signal received from the first input device maps to the first key number and the second input of the first signal received from the second input device maps to the second key number; and
   (c1) mapping the second key number to a second output code on the conversion table.

4. The method recited in claim 1, wherein a signal is a scan code.

5. The method recited in claim 1, wherein an output code being one of an alpha-numeric character and a function and a keyboard state.

6. The method recited in claim 1, wherein the input device being a first vendor's 102-key keyboard and the second input device is a second vendor's 122-key keyboard.

7. The method of claim 1, wherein the conversion table is a key table directed to one of a country language code, a local dialect language code and a variable key position keyboard code.

8. A method for processing signals from device inputs, the method comprising computer implemented steps of:
   (a) receiving a signal from an input device;
   (b) mapping the signal from the input device to a virtual key contained in an abstract key table;
   (c) determining an output code comprising:
      (i) selecting a conversion table of output codes;
      (ii) determining an entry point on the selected conversion table based on said virtual key; and
   (d) processing output codes through an operating system.

9. The method recited in claim 8, wherein the signal from the input device which is mapped to said virtual key is a first signal from a first input device which is mapped to a first virtual key and further comprising:
   (a1) receiving a second signal from a second input device; and
   (b1) mapping the second signal to said first virtual key contained in the abstract key table, wherein both the first signal received from the first input device and the second signal received from the second input device, map to said first virtual key.

10. The method recited in claim 8, wherein the signal from the input device which is mapped to said virtual key is a first signal from a first input device which is mapped to a first virtual key and further comprising:
   (a1) receiving a second input of a first signal from a second input device;
   (b1) mapping the second input of the first signal received from the second input device to a second virtual key contained in the abstract key table, wherein the first signal received from the first input device maps to said first virtual key and the second input of the first signal received from the second input device maps to said second virtual key; and (c1) determining an entry point on the selected conversion table based on said second virtual key.

11. The method recited in claim 10, said first virtual key being a first key number and said second virtual key being a second key number.

12. The method recited in claim 10, further comprising:
(c2) determining a single output from the selected conversion table based on entry points from said first virtual key and said second virtual key.

13. The method recited in claim 8, wherein the signal from the input device which is mapped to said virtual key is a first signal from a first input device which is mapped to a first virtual key and further comprising:
(a1) receiving a second signal from the first input device;
(b1) mapping the second signal to a second virtual key contained in the abstract key table; and
(c1) determining a second entry point on the selected conversion table by said first virtual key and said second virtual key.

14. The method recited in claim 13, wherein said first virtual key being a state of the first input device and said second virtual key being a key number.

15. The method recited in claim 12, wherein said first virtual key being a state of the first input device and said second virtual key being a key number.

16. The method recited in claim 10, wherein said first virtual key being first key number related to the input device and a second virtual key being a key number related to a second input device.

17. The method recited in claim 9, wherein the first input device being a first vendor's 102-key keyboard and the second input device being a second vendor's 122-key keyboard.

18. The method recited in claim 8, further comprising:
(b1) filtering said virtual key.

19. The method recited in claim 18, wherein step (b1) comprising one of receiving and correcting said virtual key, and, generating a new event for processing by the operating system, and, replacing said virtual key with a second virtual key.

20. The method recited in claim 18, wherein step (b1) comprises:
(i) calling other filtering steps; and
(ii) executing in the filtering steps in sequence.

21. The method recited in claim 8, further comprising:
(b1) filtering the output code.

22. The method recited in claim 21, wherein step (b1) comprising one of receiving or correcting the output code, and, generating a new event for processing by the operating system, and, replacing said virtual key with a second virtual key.

23. The method recited in claim 21, wherein step (b1) comprises:
(i) calling other filtering steps; and
(ii) executing the filtering steps in sequence.

24. A method in a computer for processing an event for use by an operating system for processing in the computer, wherein the event originates from an input device, the method comprising the computer implemented steps of:
receiving the event from the input device;
mapping the event to a plurality of virtual codes in a table, wherein the plurality of virtual codes contains virtual codes for a number of different input devices; and
sending an output to the operating system using the table.

25. The method of claim 24, wherein the event is that of a scan code from the input device.

26. The method of claim 25, wherein the plurality of virtual codes in the table are a plurality of virtual key numbers in an abstract virtual key board.

27. The method of claim 26, wherein the mapping step comprises:
mapping the scan code to one of a plurality of virtual key numbers.

28. The method of claim 27, wherein the mapping step further comprising:
mapping the virtual key number to an output; and
processing the output through the operating system.

29. The method of claim 28, wherein the step of mapping the virtual key comprises:
generating an output from a country key table.

30. The method of claim 27 further comprising:
filtering the virtual key number.

31. An apparatus for processing a signal from device inputs, the apparatus comprising:
(a) means for receiving a signal from a means for inputting;
(b) abstract key table means for mapping the signal to a key number of a plurality of key numbers;
(c) means for determining an output code comprising:
(i) means for selecting a means for converting; and
(ii) means for mapping the key number to an output code in selected means for converting; and
(d) means for processing the output code.

32. The apparatus recited in claim 31, wherein the signal from the means for inputting which is mapped to the key number is a first signal from a first means for inputting which is mapped to a first key number and further comprising:
(a1) means for receiving a second signal from a second means for inputting; and
(b1) abstract key table means for mapping the second signal to the first key number contained in the abstract key table, wherein the first signal and the second signal map to the first key number.

33. The apparatus recited in claim 31, wherein the signal from the means for inputting which is mapped to the key number is a first signal from a first means for inputting which is mapped to a first key number and further comprising:
(a1) means for receiving a second input of a first signal from a second means for inputting;
(b1) abstract key table means for mapping the second input of the first signal from the second means for inputting to a second key number, wherein the first signal received from the first means for inputting and the second input of the first signal from the second means for inputting represent the first key number and the second key number respectively; and
(c1) means for mapping the second key number to a second output code on the means for converting.

34. The apparatus recited in claim 31, wherein the input signal is that of a scan code.

35. The apparatus recited in claim 31, wherein an output code being one of an alpha-numeric-character and a function and a keyboard state.

36. The apparatus recited in claim 31, wherein the means for inputting is that of a first vendor's 102-key keyboard and the second means for inputting is that of a second vendor's 122-key keyboard.

37. The apparatus of claim 31 wherein the means for converting is that of a key table means directed to one of a country language code, a local dialect language code and a variable key position keyboard code.

38. An apparatus for processing signals from device inputs for further processing by a means for processing, the apparatus comprising:
 (a) means for receiving an input signal from a first means for inputting;
 (b) means for mapping the signal to a virtual key contained in an abstract key table means;
 (c) means for determining an output code comprising:
  (i) means for selecting a means for converting of output codes; and
  (ii) means for determining an entry point on selected means for converting means for converting based on said virtual key; and
 (d) means for processing the output code.

39. The apparatus recited in claim 38, wherein the signal from the means for inputting which is mapped to said virtual key is a first signal from a first means for inputting which is mapped to a first virtual key and further comprising:
 (a1) means for receiving a second signal from a second means for inputting; and
 (b1) abstract key table means for mapping the second signal to said first virtual key contained, wherein the first signal and the second signal represent said first virtual key.

40. The apparatus recited in claim 38, wherein the signal from the means for inputting which is mapped to said virtual key is a first signal from a first means for inputting which is mapped to a first virtual key and further comprising:
 (a1) means for receiving a second input of a first signal from a second means for inputting;
 (b1) abstract key table means for mapping the second input of the first signal to a second virtual key, wherein the first signal received from the first means for inputting and the second means for inputting represent the first key number and the second key number respectively; and
 (c1) means for determining an entry point on the selected means for converting based on said second virtual key.

41. The apparatus recited in claim 40, said first virtual key being a first key number and said second virtual key being a second key number.

42. The apparatus recited in claim 40, further comprising:
 (c2) means for determining a single output code from the selecting means for converting based on entry points from said first virtual key and said second virtual key.

43. The apparatus recited in claim 38, wherein the signal from the means for inputting which is mapped to said virtual key is a first signal from a first means for inputting which is mapped to a first virtual key and further comprising:
 (a1) means for receiving a second signal from the first means for inputting;
 (b1) abstract key table means for mapping the second signal to a second virtual key; and
 (c1) means for determining a second entry point on the selected means for converting by said first virtual key and said second virtual key.

44. The apparatus recited in claim 43, wherein said first virtual key being a state of the first means for inputting and said second index being a key number.

45. The apparatus recited in claim 42, wherein said first virtual key being a state of the first means for inputting and said second virtual key being a key number.

46. The apparatus recited in claim 40, wherein said first virtual key being a key number related to the first means for inputting and said second virtual key being a key number related to the second means for inputting.

47. The apparatus recited in claim 39, wherein the first means for inputting being a first vendor's 102-key keyboard and the second means for inputting being a second vendor's 122-key keyboard.

48. The apparatus recited in claim 38, wherein the signal from the means for inputting which is mapped to said virtual key is a first signal from a first means for inputting which is mapped to a first virtual key and further comprising:
 (b1) means for filtering said virtual key.

49. The apparatus recited in claim 48, wherein element (b1) comprising one of means for receiving and means for correcting said virtual key, and, means for generating a new event for processing by the processing means, and, means for decimating said virtual key, and, means or replacing said virtual key with a second virtual key.

50. The apparatus recited in claim 48, wherein element (b1) comprises:
 (i) means for calling other means for filtering; and
 (ii) means for executing the means for filtering in sequence.

51. The apparatus recited in claim 38, wherein the signal from the means for inputting which is mapped to said virtual key is a first signal from a first means for inputting which is mapped to a first virtual key and further comprising:
 (b1) means for filtering the output code.

52. The apparatus recited in claim 51, wherein element (b1) comprising one of means for receiving the output code, and, means for correcting the output code, and, means for generating a new event for the means for processing, and, means for decimating said virtual key, and, means for replacing said virtual key with a second virtual key.

53. The apparatus recited in claim 51, wherein element (b1) comprises:
 (i) means for calling other means for filtering; and
 (ii) means for executing the means for filtering in sequence.

54. An apparatus for processing an event for use by a means for processing, wherein the event originates from an means for inputting, the apparatus comprising:
 means for receiving the event from the means for inputting;
 means for mapping the event to a plurality of virtual codes, wherein the plurality of virtual codes contains virtual codes for a number of different means for inputting, wherein the means for mapping being an abstract Virtual Keyboard and the plurality of virtual codes in the means for mapping being a plurality of virtual key numbers; and
 means for sending an output to the means for processing from the means for mapping.

55. The apparatus of claim 54, wherein the event is that of a scan code from the means for inputting.

56. The apparatus of claim 55, wherein the means for mapping being an abstract Virtual Keyboard and the plurality of virtual codes in the means for mapping being a plurality of virtual key numbers.

57. The apparatus of claim 56, wherein the means for mapping an event comprises:
 means for mapping the scan code to one of a plurality of virtual key numbers.

58. The apparatus of claim 57, wherein the means for mapping further comprising:

means for mapping the virtual key number to an output; and means for processing.

59. The apparatus of claim 58, wherein the means for mapping the virtual key comprises:

means for using country keys for mapping the virtual keys to an output.

60. The apparatus of claim 57 further comprising:

means for filtering the virtual key number.

61. A computer program product for processing signals from devices, the computer program product embodied on a computer readable medium and including computer implemented instructions, comprising:

(a) instructions for receiving a signal from an input device;

(b) instructions for mapping the signal to a key number of a plurality of key numbers contained in an abstract key table;

(c) instructions for determining an output code comprising:

(i) instructions for selecting a conversion instructions table; and (ii) instructions for mapping the key number to an output code in the selected conversion table; and (d) instructions for processing output codes through an operating system.

62. The computer program product including computer implemented instructions recited in claim 61, wherein the signal from the input device which is mapped to the key number is a first signal from a first input device which is mapped to a first key number and further comprising:

(a1) instructions for receiving a second signal from a second input device; and (b1) instructions for mapping the second signal to the first key number contained in the abstract key table, wherein both the first signal received from the first input device and the second signal received from the second input device map to the first key number.

63. The computer program product including computer implemented instructions recited in claim 61, wherein the signal from the input device which is mapped to the key number is a first signal from a first input device which is mapped to a first key number and further comprising:

(a1) instructions for receiving a second input of the first signal from a second input device;

(b1) instructions for mapping the second input of the first signal to a second key number contained in the abstract key table, wherein the first signal received from the first input device maps to the first key number and the second input of the first signal received from the second input device maps to the second key number; and (c1) instructions for mapping the second key number to a second output code on the conversion table.

64. The computer program product comprising computer implemented instructions recited in claim 61, wherein the input signal is a scan code.

65. The computer program product comprising computer implemented instructions recited in claim 61, wherein an output code being one of an alpha-numeric character and a function and a keyboard state.

66. The computer program product comprising computer implemented instructions recited in claim 61, wherein the input device is a first vendor's 102-key keyboard and the second input device is a second vendor's 122-key keyboard.

67. The computer program product comprising computer implemented instructions of claim 61 wherein the conversion table is a key table directed to one of a country language code, a local dialect language code and a variable key position keyboard code.

68. A computer program product for processing signals from devices, the computer program product embodied on a computer readable medium and including computer implemented instructions, comprising:

(a) instructions for receiving an input signal from a first input device;

(b) instructions for mapping the signal to a virtual key contained in an abstract key table;

(c) instructions for determining an output code comprising:

(i) instructions for selecting a conversion table of output codes;

(ii) instructions for determining an entry point on the selected conversion table based on said virtual key; and (d) instructions for processing output codes through an operating system.

69. The computer program product including computer implemented instructions recited in claim 68, wherein the signal from the input device which is mapped to said virtual key is a first signal from a first input device which is mapped to a first virtual key and further comprising:

(a1) instructions for receiving a second signal from a second input device; and (b1) instructions for mapping the second signal to said first virtual key contained in the abstract key table, wherein the first signal and the second signal represent said first virtual key.

70. The computer program product including computer implemented instructions recited in claim 68, wherein the signal from the input device which is mapped to said virtual key is a first signal from a first input device which is mapped to a first virtual key and further comprising:

(a1) instructions for receiving a second input of a first signal from a second input device;

(b1) instructions for mapping the second input of the first signal to a second virtual key contained in the abstract key table, wherein the first signal received from the first input device and the second input of the first signal from the second input device represent the first key number and the second key number respectively; and (c1) instructions for determining an entry point on the selected conversion table based on second virtual key.

71. The computer program product comprising computer implemented instructions recited in claim 70, said first virtual key being a first key number and said second virtual key being a second key number.

72. The computer program product comprising computer implemented instructions recited in claim 70 further comprising:

(c2) instructions for determining a single output code from the selected conversion table based on the entry points from said first virtual key and said second virtual key.

73. The computer program product including computer implemented instructions recited in claim 68, wherein the signal from the input device which is mapped to said virtual key is a first signal from a first input device which is mapped to a first virtual key and further comprising:

(a1) instructions for receiving a second signal from the first input device;

(b1) instructions for mapping the second signal to a second virtual key contained in the abstract key table; and (c1) instructions for determining a second entry point on the selected conversion table by said first virtual key and said second virtual key.

74. The computer program product comprising computer implemented instructions recited in claim 73, wherein said first virtual key being a state of the first input device and said second virtual key being a key number.

75. The computer program product comprising computer implemented instructions recited in claim 72, wherein said first virtual key being a state of the first input device and said second virtual key being a key number.

76. The computer program product comprising computer implemented instructions recited in claim 70, wherein said first virtual key being a key number related to the first input device and said second virtual key being a key number related to a second input device.

77. The computer program product comprising computer implemented instructions recited in claim 69, wherein the first input device being a first vendor's 102-key keyboard and the second input device being a second vendor's 122-key keyboard.

78. The computer program product comprising computer implemented instructions recited in claim 68, further comprising:

(b1) instructions for filtering the virtual key.

79. The computer program product comprising computer implemented instructions recited in claim 78, wherein the instructions (b1) comprise one of instructions for receiving and correcting said virtual key, and, instructions for generating a new event for processing by the operating system, and, instructions for decimating said virtual key, and, replacing said virtual key with a second virtual key.

80. The computer program product comprising computer implemented instructions recited in claim 78, wherein the instructions (b1) comprises:

(i) instructions for calling other instructions for filtering; and (ii) executing in the instructions for filtering in sequence.

81. The computer program product comprising computer implemented instructions recited in claim 68, further comprising:

(b1) instructions for filtering the output code.

82. The computer program product comprising computer implemented instructions recited in claim 81, wherein the instructions (b1) comprise one of instructions for receiving or correcting the output code, and, instructions for generating a new event for processing by the operating system, and, instructions for decimating said virtual key, and, replacing said virtual key with a second virtual key.

83. The computer program product comprising computer implemented instructions recited in claim 81, wherein the instructions (b1) comprises:

(i) instructions for calling other instructions for filtering; and (ii) executing[]in the instructions for filtering in sequence.

84. A computer program product for processing an event for use by an operating system for processing in the computer, wherein the event originates from an input device, the product embodied on a computer readable medium comprising computer implemented instructions of:

instructions for receiving the event from the input device;

instructions for mapping the event to a plurality of virtual codes in a table, wherein the plurality of virtual codes contains virtual codes for a number of different input devices; and instructions for sending an output to the operating system using the table.

85. The computer program product comprising computer implemented instructions of claim 84, wherein the event is that of a scan code from the input device.

86. The computer program product comprising computer implemented instructions of claim 85, wherein the plurality of virtual codes in the table are a plurality of virtual key numbers in an abstract virtual key board.

87. The computer program product comprising computer implemented instructions of claim 86, wherein the instructions for mapping comprises:

instructions for mapping the scan code to one of a plurality of virtual key numbers.

88. The computer program product comprising computer implemented instructions of claim 87, wherein the instructions for mapping further comprising:

instructions for mapping the virtual key number to an output; and instructions for processing the output through the operating system.

89. The computer program product comprising computer implemented instructions of claim 88, wherein the instructions for of mapping the virtual key comprises:

instructions for generating an output from a country key table.

90. The computer program product comprising computer implemented instructions of claim 87 further comprising:

instructions for filtering the virtual key number.

\* \* \* \* \*

UNITED STATES PATENT AND TRADEMARK OFFICE
CERTIFICATE OF CORRECTION

PATENT NO.     : 6,429,793 B1
DATED          : August 6, 2002
INVENTOR(S)    : Paolini It is certified that error appears in the above-identified patent and that said Letters Patent is hereby corrected as shown below:

Column 18,
Line 6, after "executing", please delete "[]".

Signed and Sealed this

Twenty-ninth Day of April, 2003

JAMES E. ROGAN
*Director of the United States Patent and Trademark Office*